US012704100B2

(12) United States Patent
Juchems et al.

(10) Patent No.: US 12,704,100 B2
(45) Date of Patent: Aug. 11, 2026

(54) INJECTOR VALVE FORCE CONTROL

(71) Applicant: Caterpillar Inc., Peoria, IL (US)

(72) Inventors: Mitchell B. Juchems, Eureka, IL (US); Daniel R. Puckett, Peoria, IL (US); Michael Linde, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 18/982,453

(22) Filed: Dec. 16, 2024

(65) Prior Publication Data

US 2026/0168457 A1 Jun. 18, 2026

(51) Int. Cl.
*F02D 41/40* (2006.01)
*F02D 41/30* (2006.01)

(52) U.S. Cl.
CPC ........... *F02D 41/401* (2013.01); *F02D 41/30* (2013.01)

(58) Field of Classification Search
CPC ............................... F02D 41/401; F02D 41/30
See application file for complete search history.

(56) References Cited

U.S. PATENT DOCUMENTS

| | | | | |
|---|---|---|---|---|
| 5,995,356 | A * | 11/1999 | Glavmo | F02D 41/20 361/160 |
| 10,557,437 | B2 | 2/2020 | Iwano et al. | |
| 11,230,990 | B2 | 1/2022 | Puckett et al. | |
| 11,313,338 | B1 | 4/2022 | Marrack et al. | |
| 11,795,887 | B1 | 10/2023 | Juchems et al. | |
| 2009/0005955 | A1 * | 1/2009 | Askew | F02D 41/20 123/476 |
| 2014/0123960 | A1 * | 5/2014 | Imai | F02D 41/30 123/490 |
| 2018/0171955 | A1 * | 6/2018 | Rezaei | F02M 21/02 |
| 2024/0044299 | A1 | 2/2024 | Marrack et al. | |

* cited by examiner

*Primary Examiner* — Syed O Hasan

(57) ABSTRACT

A method includes applying a first current to a control valve having an actuated state and a resting state, the first current causing the control valve to move from the resting state to the actuated state. The method includes applying a second current that causes the control valve to remain in the actuated state, the second current having an amplitude that is lower than an amplitude of the first current. The method includes maintaining the second current for a duration. The method includes stopping the second current at an end of the duration to allow the control valve to return to the resting state. The method includes measuring a control valve return time. The method includes setting an amplitude of current for a fuel injection event based on the control valve return time.

13 Claims, 6 Drawing Sheets

INJECTOR VALVE FORCE CONTROL

TECHNICAL FIELD

The present disclosure relates generally to internal combustion engines, and more particularly, to methods and systems for controlling a fuel injector of an internal combustion engine.

BACKGROUND

Internal combustion engine typically include an electronic controller that governs and monitors various aspects of the operation of the internal combustion engine. For example, some controllers adjust the timing and quantity of fuel injected into the internal combustion engine by fuel injectors. In relatively sophisticated internal combustion engine systems, the controller monitors operation of the fuel injectors. Systems that are capable of monitoring fuel injectors, while helpful for improving the precision of the injector, can sometimes experience instability and diminished performance, for example due to injector-to-injector variability introduced by manufacturing tolerances, electro-magnetic characteristics of a particular injector, and other differences between injectors of the same type.

U.S. Pat. No. 10,557,437, issued on Feb. 11, 2020 ("the '437 patent"), describes fuel injection pumps (fuel injectors) provided in each cylinder of a diesel engine. An engine control unit shapes the waveform of current that is used to drive a spill valve of the fuel injector. The control unit is capable of operating in a full automatic mode or in a manual mode for shaping the current waveform. The automatic mode causes the control unit to detect the closing time of the spill valve and shape a current waveform based on the detected closure of the spill valve. The system in the '437 patent does not, however, describe adjusting current based on valve return timing.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY OF THE DISCLOSURE

In one aspect, a method for controlling a fuel injector may include: applying a first current to a control valve having an actuated state and a resting state, the first current causing the control valve to move from the resting state to the actuated state; applying a second current that causes the control valve to remain in the actuated state, the second current having an amplitude that is lower than an amplitude of the first current; maintaining the second current for a duration; stopping the second current at an end of the duration to allow the control valve to return to the resting state; measuring a control valve return time; and setting an amplitude of current for a fuel injection event based on the control valve return time.

In another aspect, a method for controlling a fuel injector may include: determining an expected valve return time for a valve of the fuel injector, the expected valve return time being associated with an amplitude of current; applying a current to the valve, the valve having an actuated state and a resting state, the current causing the valve to be in the actuated state; stopping supply of the current to the valve; measuring a valve return time after stopping supply of the current; comparing the measured valve return time to the expected valve return time; and setting a current amplitude for a fuel injection event based on the comparison.

In yet another aspect, a system for controlling a fuel injector may include: a control valve having an actuated state and a resting state; a control valve solenoid capable of causing the control valve to move between the actuated state and the resting state; and a controller, the controller configured to: determine an expected control valve return time at which the control valve returns to the resting state from the actuated state, apply current to the control valve for a duration, measure the control valve return time, compare the measured control valve return time to the expected control valve return time, and determine an amplitude of current for a fuel injection event based on the comparison.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of +10% in the stated value. In this disclosure, unless stated otherwise, a "controller" that is implemented as a physical device includes one or multiple physical devices.

Figure 1:
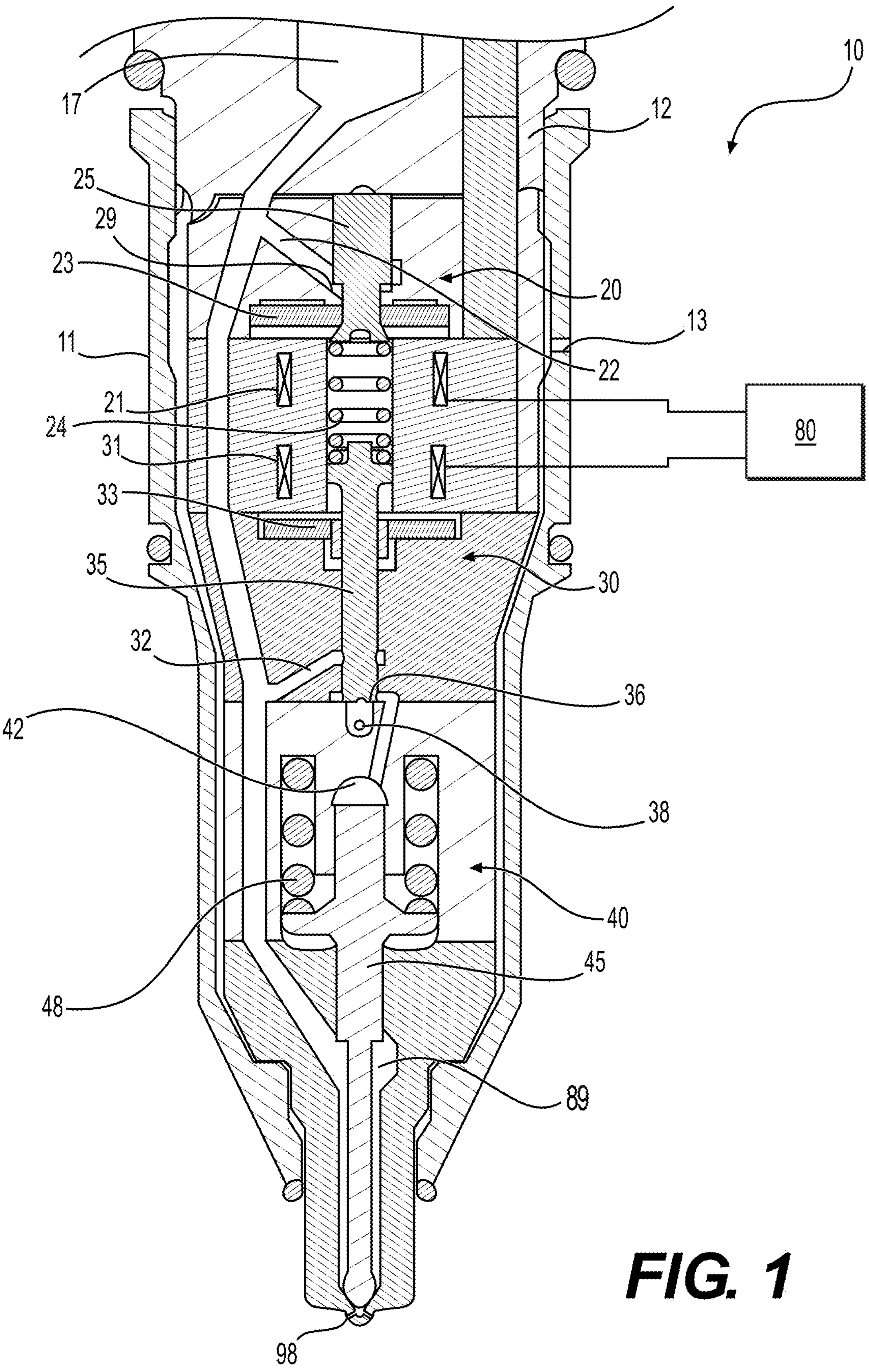
FIG. 1 depicts a schematic, cross-sectional view of a fuel injector for an internal combustion engine.

FIG. 1 is a cross-sectional partially-schematic view of a fuel injection system 10 for controlling an amplitude of current supplied to one or more electronically-controlled valves of a fuel injector 12. As shown in FIG. 1, system 10 may include fuel injector 12 and an electronic control unit (ECM) 80. Fuel injector 12 may include one or multiple electronically-controlled valves. As shown in the example illustrated in FIG. 1, injector 12 may be a mechanically-actuated, electronically-controlled fuel injector for an internal combustion engine. Fuel within injector 12 may be pressurized by a cam (not shown) and injected based on signals generated with ECM 80. In other examples, fuel within injector 12 may be received from a common rail that distributes pressurized fuel.

As illustrated in FIG. 1, fuel injector 12 may include an injector body 11. Injector body 11 may house components of fuel injector 12, such as a fuel reservoir 17, one or more valves (e.g., electronically-controlled solenoid valves) such as a spill valve 20 and a control valve 30, and a series of passages for supplying, returning, and injecting fuel. Fuel reservoir 17 may receive fuel from a fuel source (not shown) and may be pressurized, such as by a cam-actuated piston (not shown), to provide pressurized fuel to open a check valve 40. The operation of check valve 40 may be governed by spill valve 20 and control valve 30.

Spill valve 20 may be a normally-open valve that includes a spill valve solenoid 21, a spill valve armature 23, a spill valve member 25, and a spill valve seat 29. When spill valve 20 is at rest (e.g., when spill valve 20 is not actuated by electrical energy), spill valve 20 is in a fully-open position, as illustrated in FIG. 1. In the fully-open position, spill valve member 25 may be positioned away from spill valve seat 29, permitting communication between a spill passage 22 and a fuel return passage 13. With spill valve 20 in this position, fuel is allowed to drain from fuel injector 12, thereby reducing the pressure within fuel injector 12 (e.g., the pressure within fuel reservoir 17). Spill valve 20 may be biased toward the fully-open position by a spring 24.

When spill valve 20 is fully actuated (e.g., by electrical energy), spill valve 20 is in a closed position. In the closed position, spill valve member 25 may engage with spill valve seat 29, preventing communication between spill passage 22 and fuel return passage 13. In such a configuration, fuel is not allowed to drain from fuel injector 12, allowing the pressure within fuel injector 12 (e.g., the pressure within fuel reservoir 17) to increase. Thus, the actuated or closed position of spill valve 20 may be associated with the injection of fuel.

Control valve 30 may include a control valve solenoid 31, a control valve armature 33, a control valve member 35, and a control valve seat 36. When control valve 30 is at rest (e.g., when control valve 30 is not actuated by electrical energy), control valve 30 is in a non-actuated position, also referred to as a non-injection position, as illustrated in FIG. 1. In the non-injection position, control valve member 35 may be positioned so as to permit communication between a control chamber 42 and a high-pressure connection passage 32, as illustrated in FIG. 1. In such a configuration, control valve member 35 may engage with control valve seat 36 and prevent communication between control chamber 42 and a low-pressure connection passage 38, placing control chamber 42 in a pressurized condition that prevents motion of check a valve member 45, as described below. Control valve 30 may be biased toward the non-injection control position by spring 24.

When control valve 30 is fully actuated (e.g., by electrical energy), control valve 30 is in an actuated position, also referred to as an injection position. In the injection position, control valve member 35 may prevent communication between control chamber 42 and high-pressure connection passage 32, and may permit communication between control chamber 42 and low-pressure connection passage 38, thereby decreasing pressure in control chamber 42. The decreased pressure in control chamber 42 allows check valve member 45 to move, and ultimately allows fuel injector 12 to release fuel.

Check valve 40 may be a one-way valve including check valve member 45 that, when in a closed check position as illustrated in FIG. 1, prevents communication between a check valve chamber 89 and injection orifices 98. When in an open position, communication may be permitted between check valve chamber 89 and injection orifices 98, allowing fuel to be injected. A spring 48 may bias check valve member 45 toward the closed position. Additionally, check valve member 45 may be held in the closed position when control chamber 42 is in communication with high-pressure connection passage 32 (e.g., when control valve 30 is in the closed control position, as described above). Needle valve member 45 may be configured to move from this closed position to an open position when control valve 30 is in the actuated or open control position. For example, when spill valve 20 is in the closed position and control valve 30 is in the open position, control chamber 42 may be at a lower pressure compared to pressure within check valve chamber 89, thereby allowing pressurized fuel in check valve chamber 89 to act against a biasing force of spring 48, lift check valve member 45, and release fuel through orifices 98.

Figure 6:
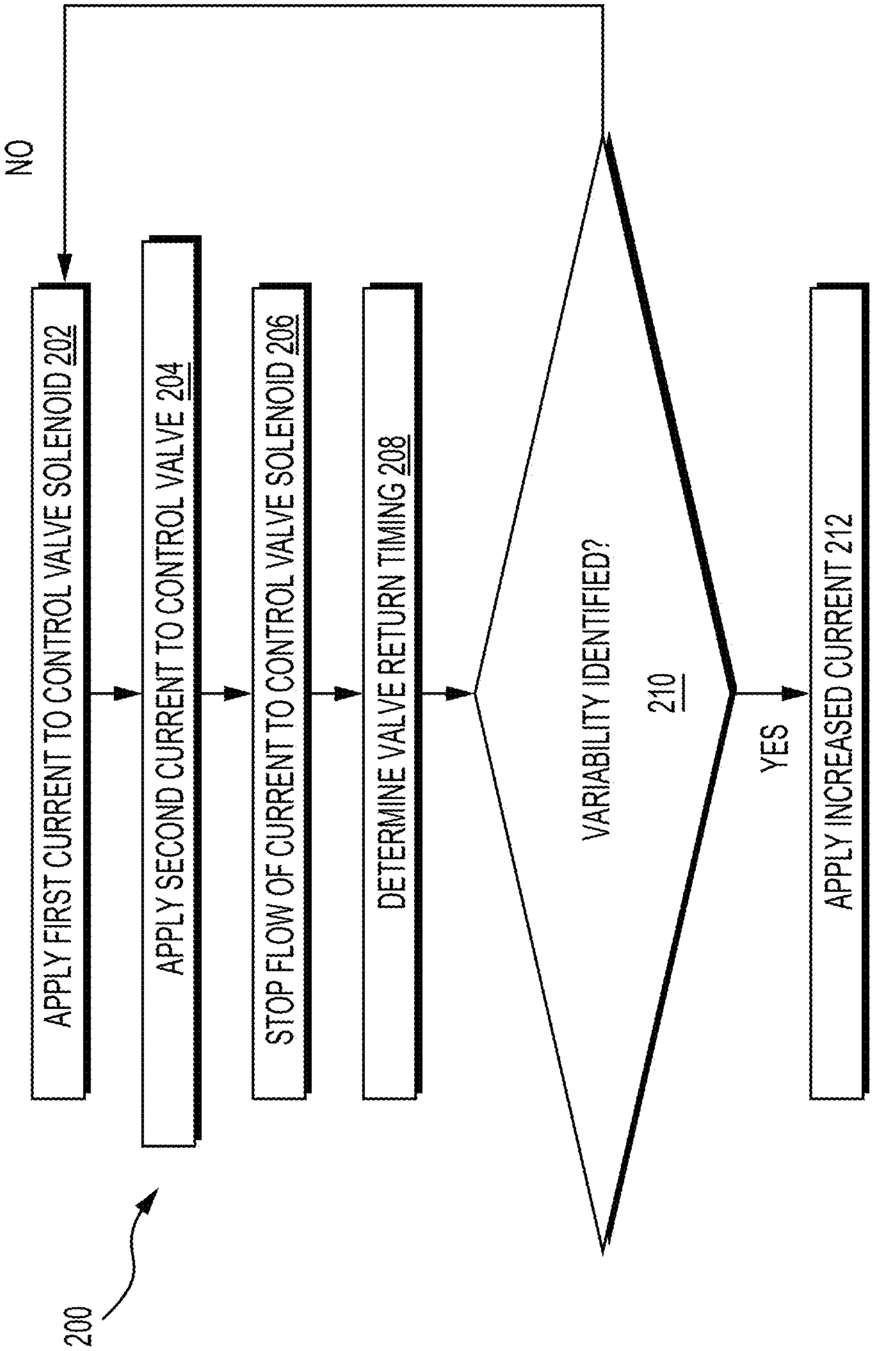
FIG. 6 depicts a flowchart of a method for controlling the variability of fuel injector.

ECM 80 may be configured to receive sensed inputs and generate commands or other signals to monitor or control the operation of a plurality of fuel injectors 12 of fuel injection system 10. ECM 80 may include a single microprocessor or multiple microprocessors that receive inputs and issue control signals, including the application of electrical energy to solenoids 21 and 31. ECM 80 may be configured to control the application of electrical energy, and therefore current, applied to solenoids 21 and 31. For example, ECM 80 may issue commands to selectively energize (e.g., by increasing a current applied to) solenoids 21 and 31 with electrical power and may control circuitry configured to de-energize (e.g., reduce a current applied to) solenoids 21 and 31 and/or control a rate of decay of electrical energy stored by solenoids 21 and 31. ECM 80 may include a memory, a secondary storage device, a processor, such as a central processing unit, or any other means for accomplishing a task consistent with the present disclosure. The memory or secondary storage device associated with ECM 80 may store data and software to allow ECM 80 to perform its functions, including the functions described below with respect to method 200 (FIG. 6). In particular, data and software in memory or secondary storage device(s) may allow ECM 80 to perform any of the valve return timing, signal analyses, and adaptive injector control functions described herein. Numerous commercially available microprocessors can be configured to perform the functions of ECM 80. Various other known circuits may be associated with ECM 80, including signal-conditioning circuitry, communication circuitry, and other appropriate circuitry. ECM 80 is discussed in more detail in regard to FIG. 2.

Figure 2:
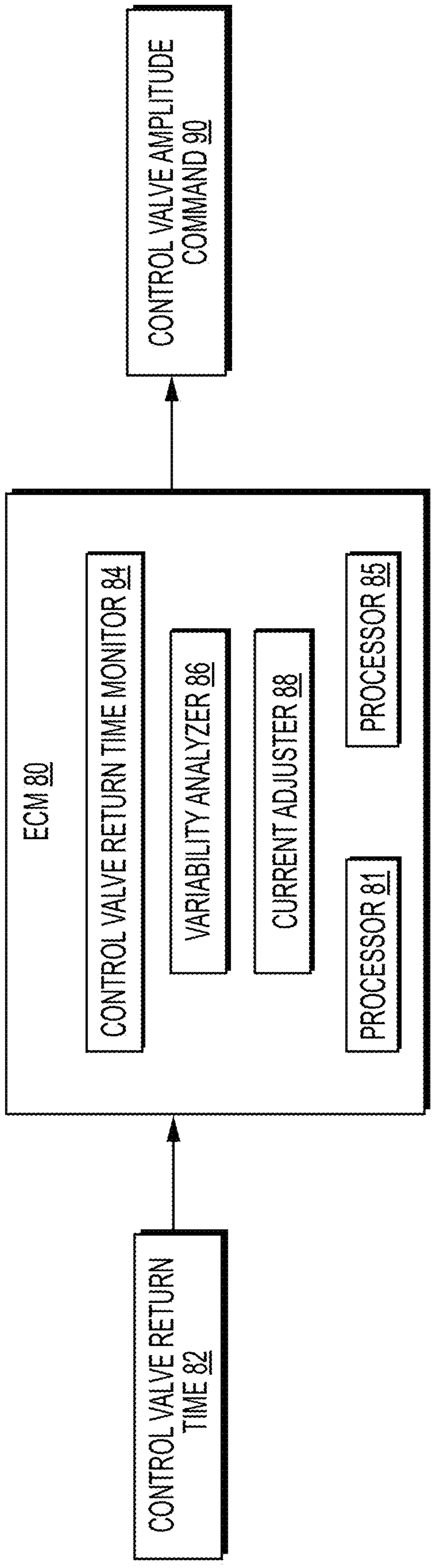
FIG. 2 depicts a block diagram of an exemplary electronic control module for controlling the fuel injector of FIG. 1.

FIG. 2 depicts a block diagram of an exemplary electronic control module (ECM) 80. As mentioned above, ECM 80 may include a processor 81, a memory 85, or any other means for accomplishing a task consistent with the present disclosure. ECM 80 may also include a control valve return time monitor 84, a variability analyzer 86, and a current adjuster 88. As mentioned above, ECM 80 may be operative to generate and output commands for controlling a fuel injector 12, such as a control valve amplitude command 90 controlling electrical energy applied to a control valve 30 (e.g., a control valve solenoid 31). Control valve amplitude command 90 may be generated or output by the ECM 80 in the form of signals or waveforms that correspond to instructions for applying or providing electrical energy to control valve solenoid 31. ECM 80 may generate and output commands for controlling fuel injector 12 based on or in response to the variability of a control valve return time 82, time 82 being determined based on analysis of current that is monitored with ECM 80, as described below. Control valve return time 82 may be associated with a duration of actuation, the amount of time that a valve is actuated. The duration of actuation is a value that may be calculated by monitor 84.

Control valve return time 82 may represent the time it takes for control valve 30 to return to a resting state from an actuated state, and is included in current (e.g., induced current) monitored by control valve return time monitor 84 of ECM 80. Variability in control valve return times may occur when the amount of current applied to control valve solenoid 31 is insufficient to maintain control valve 30 in the actuated state. Control valve return time monitor 84 may determine and, if desired, store (e.g., record in memory) each control valve return time 82. Control valve return time monitor 84 may also determine the duration of actuation of control valve solenoid 31, and associate this duration with control valve return time 82. Control valve return time monitor 84 may be able to store multiple control valve return times 82, as well as values representing the amount of time that the valve was actuated, to determine the variability of valve return time 82.

Once one or a plurality of control valve return times 82 have been recorded by the control valve return time monitor 84, variability analyzer 86 may analyze control valve return times 82 for variability. In one embodiment, variability analyzer 86 determines variability in the control valve return time by comparing one or a plurality of measured control valve return times 82 against known or expected control valve return times and identifying any instances where the measured control valve return time 82 deviates from the expected control valve return time. The expected control valve return time may be determined by ECM 80 with the use of a look-up table, map, or other data based on historical data for one or multiple fuel injectors (e.g., end of line testing, modeling, etc.). Variability analyzer 86 may determine that a control valve return time indicates variability where the measured control valve return time 82 is earlier than the expected control valve return time. When variability analyzer 86 determines that variability exists, current adjuster 88 may output control valve amplitude command 90 that increases the current.

In another embodiment, variability analyzer 86 may determine whether one or multiple control valve return times 82 exceeds a threshold associated with variability. Variability analyzer 86 may determine variability exists by calculating a mean control valve return time using a plurality of previously-detected control valve return times 82. Variability analyzer 86 may then determine if control valve return time 82 deviates from the calculated mean control valve return time by a variability threshold value. The variability threshold value may be the threshold at which the deviation in control valve return time 82 from the calculated mean control valve return time indicates that begins to affect an amount of fuel that is injected by injector 12. The deviation between measured control valve return time 82 and the mean control valve return time may therefore represent variability in the amount of fuel injected with injector 12.

If the variability in one or multiple control valve return times 82 exceeds a threshold value, current adjuster 88 may output a control valve amplitude command 90 that increases current applied to control valve solenoid 31 in a subsequent injection. This increased current may be applied for one or multiple fuel injection events. Current adjuster 88 may repeatedly increase second current 102 associated with control valve amplitude command 90 until each control valve return time 82 indicates that variability is no longer present (e.g., time 82 represents variability that does not exceed the variability threshold, or predetermined number of valve return times 82 do not exceed the variability threshold). Current adjuster 88 may be configured to adjust the current of a plurality of injectors 12 to different amplitudes, based on variability that is monitored individually for each injector 12. However, if desired, the amplitude of current may be adjusted for a group of injectors 12 such that each injector 12 is provided with the same current amplitude or substantially the same current amplitude.

If the variability of a predetermined number of control valve return times 82 is equal to or below the variability threshold or the expected control valve return time, current adjuster 88 may output a control valve amplitude command 90 that decreases the current applied to control valve solenoid 31. Current adjuster 88 may decrease the second current 102 associated with the control valve amplitude command 90 until at least one, or a threshold number of, measured control valve return time 82 indicates variability. Current adjuster 88 may continue to decrease the control valve amplitude command 90 for second current 102 until variability analyzer 86 is able to identify the smallest current that results in control valve return times 82 that are substantially equivalent to expected valve return times. Decreasing current may reduce heat and increase efficiency, for example.

Figure 3A:
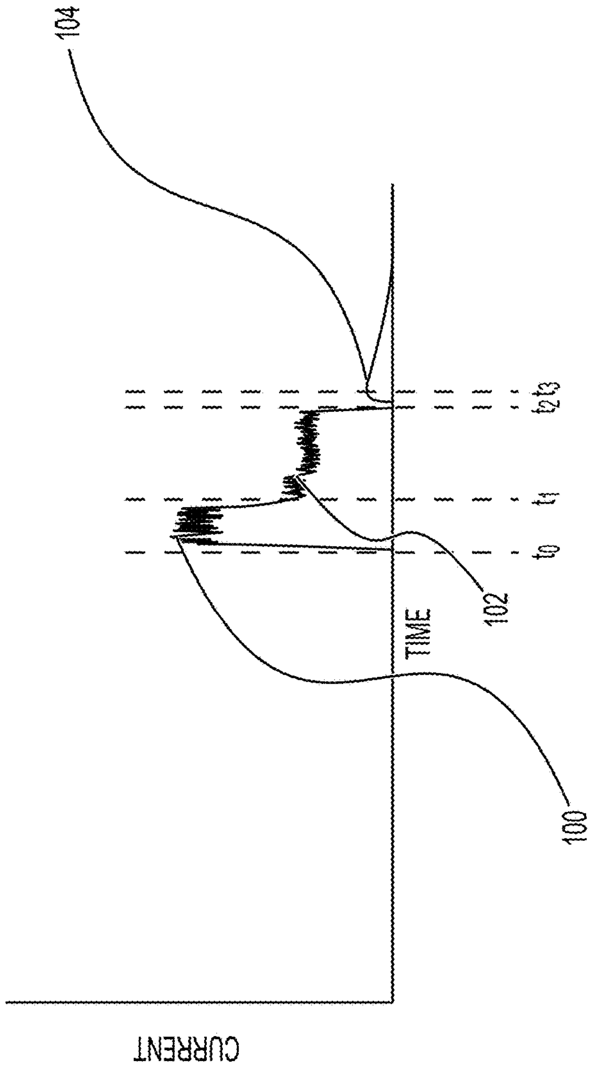
FIG. 3A depicts a graph showing a waveform representing the current applied to an electronically-controlled valve of the fuel injector of FIG. 1 as a function of time.

FIG. 3A is a graph depicting an example of a waveform applied to control valve solenoid 31 as a function of time. The waveform includes a first current 100 that is applied to the control valve solenoid 31 beginning at time $t_0$. At time $t_1$, a lower, second current 102 begins to be applied to control valve solenoid 31. At time $t_2$, current is no longer supplied to control valve solenoid 31. At time $t_3$, the waveform depicts an induced current 104 that results from application of the first current 100 and second current 102.

First current 101 may have a relatively high amplitude to begin actuation of control valve 30. Once control valve 30 is fully actuated, at or around time $t_1$, second current 102 may be applied to control valve solenoid 31 to keep control valve 30 open and in the actuated state until the completion of the fuel injection. At time $t_2$, the fuel injection may be complete, and second current 102 is stopped in order for armature 33 to return to a resting state. At time $t_3$, armature 33 may begin returning to rest within solenoid 31, resulting in an induced current 104 through control valve solenoid 31. The magnitude of induced current 104 may increase in relation to the magnitude of second current 102 applied to control valve solenoid 31.

Figure 3B:
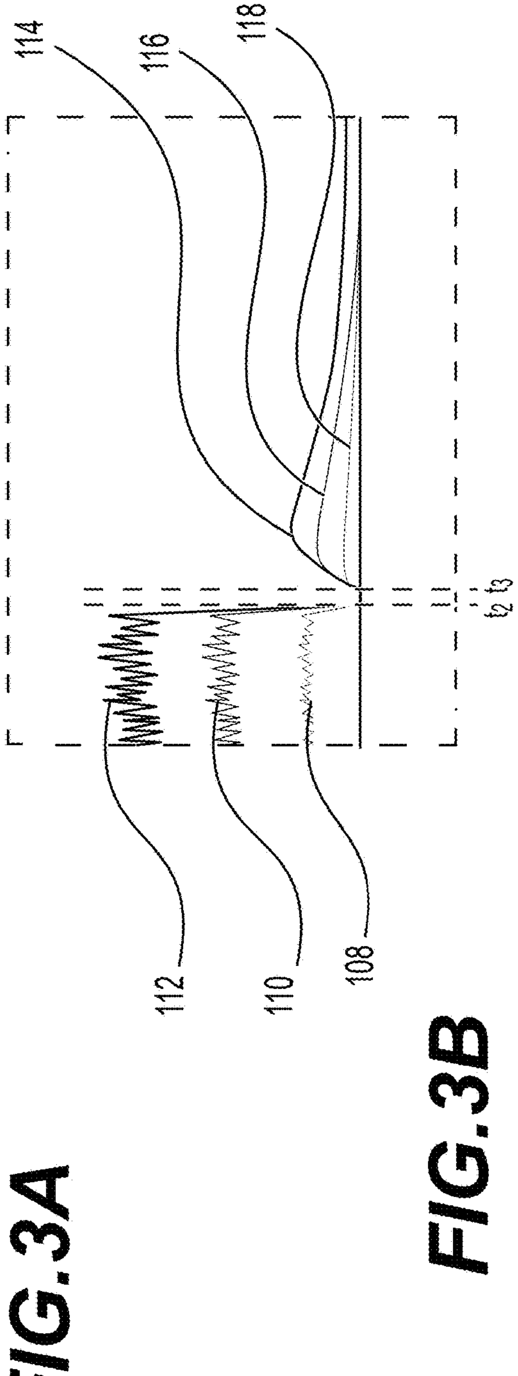
FIG. 3B depicts three current waveforms for the electronically-controlled valve of the fuel injector of FIG. 1.

FIG. 3B is a graph depicting different induced currents that result from three second currents 102 of differing amplitude. In particular, FIG. 3B shows three different examples of second currents 102: current 108, current 110, and current 112. At time $t_2$, flow of each of current 108, current 110, and current 112 is stopped. At time $t_3$, as armature 33 of control valve solenoid 31 begins returning to the non-actuated position. Induced current 118, induced current 116, and induced current 114, respectively, result from the motion of armature 33. The peak of each current 108, 110, and 112 represents the time at which control valve member 35 reaches the resting (non-actuated) position. As shown in FIG. 3B, as current increases, the valve return time indicated by the peak of current occurs later in time. In particular, current 108 is associated with induced current 118 which has a first valve return time, a larger current 110 is associated with induced current 116 which has a second, later, valve return time, and a largest current 112 is associated with a third induced current 114 which has the latest valve return time of the three examples illustrated in FIG. 3B.

Figure 4A:
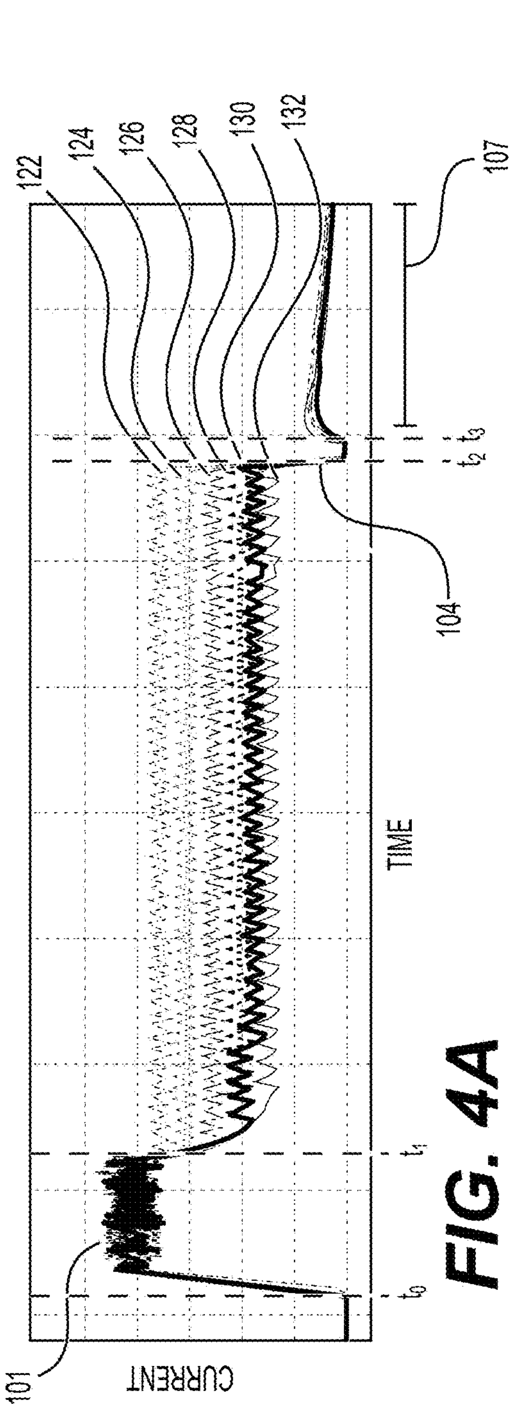
FIG. 4A depicts a graph of six different waveforms representing six different currents applied to an electronically-controlled valve of a fuel injector as a function of time.

FIG. 4A depicts six different waveforms of six different currents applied to control valve solenoid 31. Each of the six waveforms is applied to control valve solenoid 31 separately. For each waveform, first current 101 may be applied at time $t_0$ to control valve solenoid 31 as described above. At time $t_1$, each waveform adjusts to a second current corresponding to current 122, current 124, current 126, current 128, current 130, or current 132. Current 122, current 124, current 126, current 128, current 130, and current 132 may be lower than first current 101. However, in at least some embodiments, first current 101 may have the same amplitude as the second current (e.g., by lowering the amplitude of first current 101). At time $t_2$, flow of current (e.g., current 122, current 124, current 126, current 128, current 130, or current 132) to control valve solenoid 31 is stopped. At time $t_3$, induced current 107 may result as armature 33 of control valve solenoid 31 returns to rest, induced current 107 corresponding to current that is monitored to determine control valve return time 82 (FIG. 2).

The strength of the individual induced currents which may be generated by current 122, current 124, current 126, current 128, current 130, and current 132 may be correlated to the strength of the accompanying second current. Increasing amplitude of a second current may generally result in an increased induced current amplitude. Similarly, a second current that results in variability in the control valve control time will generally result in an induced current that peaks early. For instance, as shown in FIG. 4A, current 132 results in an induced current that peaks before the induced currents that result from the five other currents.

Figure 4B:
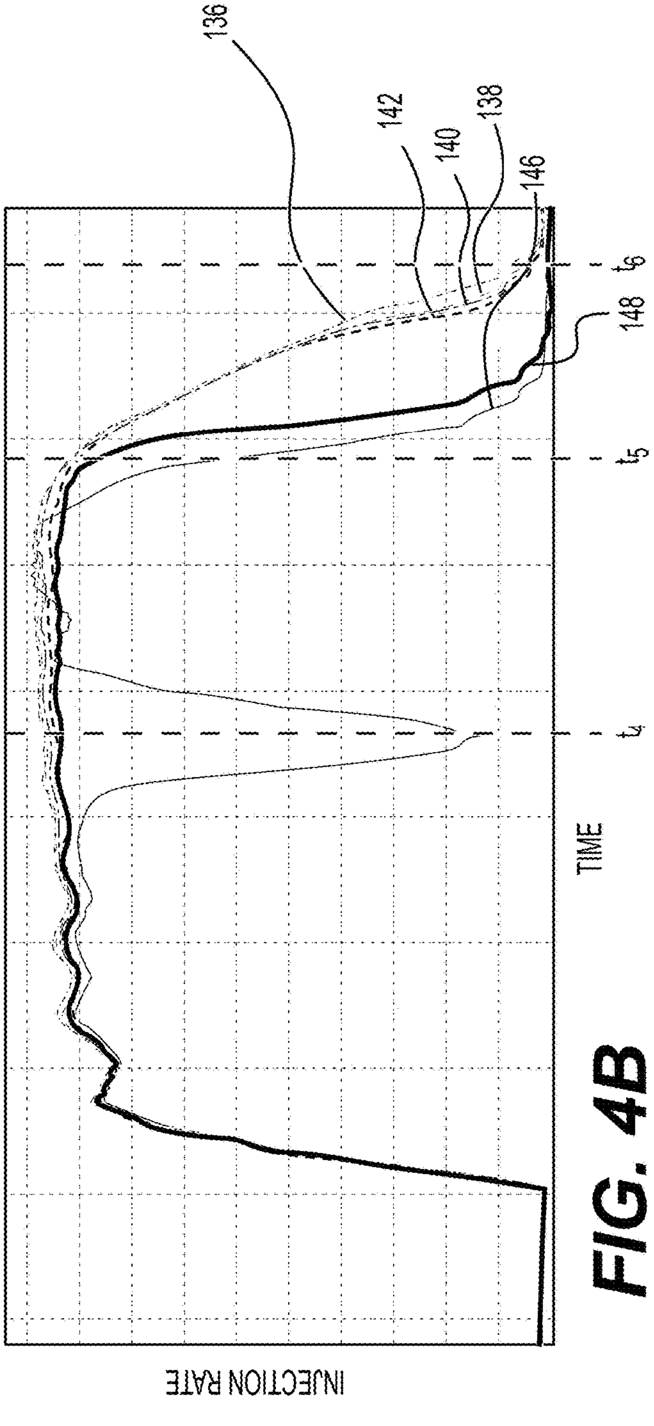
FIG. 4B depicts a graph of six different injection rates, each of which corresponds to one of the waveforms in FIG. 4A, showing the correlation between injection rate of the electronically-controlled valve as a function of time and the magnitude of the waveform.

FIG. 4B is a graph depicting the six different rates of fuel injection as a function of time. Each rate of injection may be the result of one of the six waveforms applied to control valve solenoid 31 in FIG. 4A. In the illustrated example, rate of injection 136 corresponds to current 122, rate of injection 138 corresponds current 124, rate of injection 140 corresponds to current 126, rate of injection 142 corresponds to current 128, rate of injection 146 corresponds to current 132, and rate of injection 148 corresponds to current 130.

Rate of injection 136, rate of injection 138, rate of injection 140, and rate of injection 142 represent successful fuel injections, injections during which variability does not exceed the variability threshold. As shown, rate of injection 136, rate of injection 138, rate of injection 140, and rate of injection 142 are relatively consistent across the entire injection event. Rate of injection 148 may correspond to the waveform in which current 130 is applied. Rate of injection 148 ends earlier than rate of injection 136, rate of injection 138, rate of injection 140, and rate of injection 142 at time $t_5$ (corresponding to when the flow of current ends to control valve solenoid 31), resulting in less fuel being injected.

In the illustrated example, rate of injection 146 becomes unstable part-way through the fuel injection event and almost terminates at about the middle of the fuel injection event at time $t_4$ before once more increasing. As shown in FIG. 4B, rate of injection 146 also ends more quickly than all other rates of injection.

The unstable or variable fuel injection, such as occurs with rate of injection 146 and rate of injection 148, may correspond to shorter-than-expected control valve return times. For instance, current 132 may result in a shorter control valve return at time $t_4$ (since the control valve is already partially returning to rest) compared to time $t_5$ at which time the control valve is fully actuated. Control valve return times $t_4$ and time $t_5$ represent an inconsistent, or variable, control valve return time. On the contrary, the control valve return time of current 122, current 124, current 126, and current 128 at approximately time $t_0$ are generally consistent (e.g., non-variable) since the control valve was fully actuated and returns at a time that corresponds to the expected valve return time.

Figure 5:
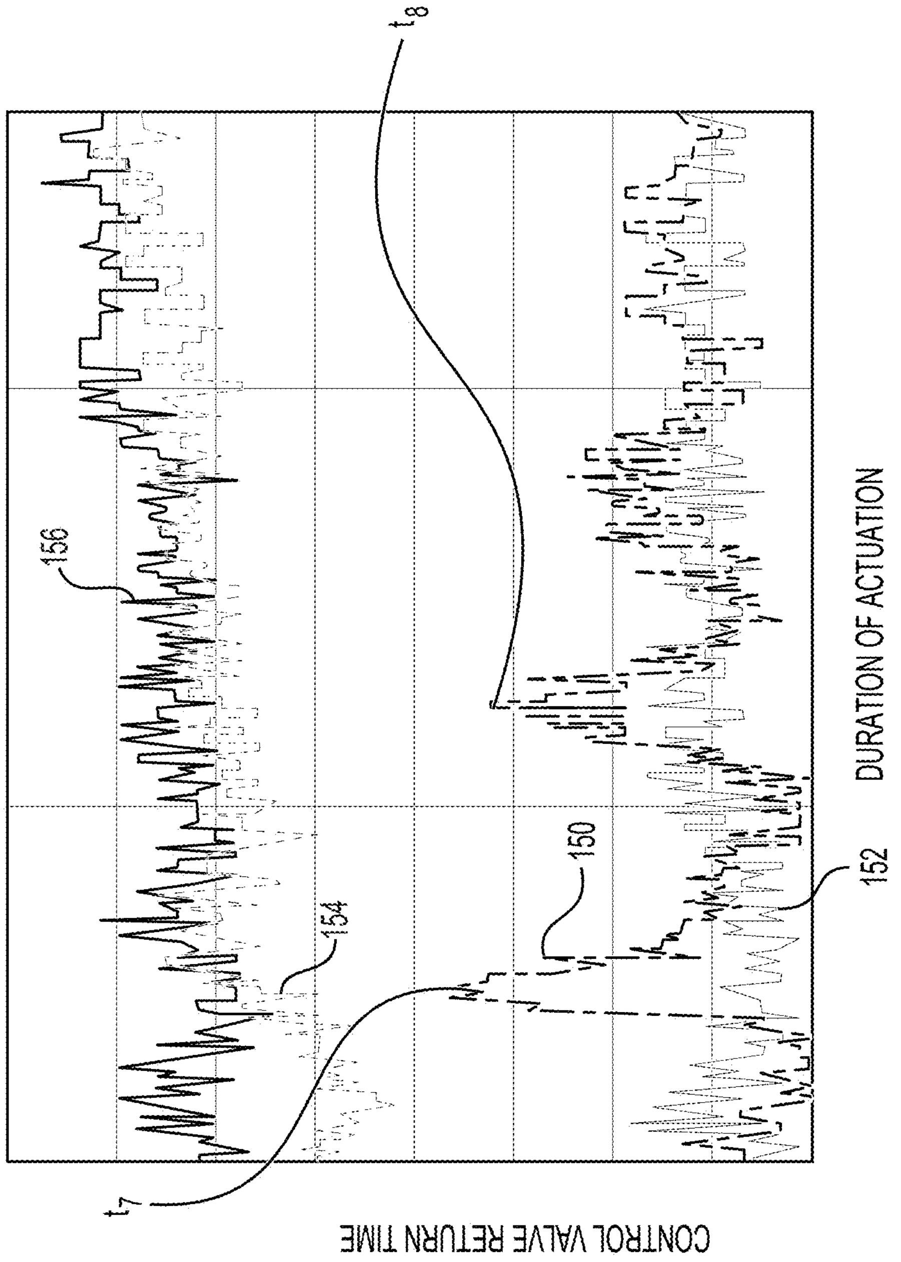
FIG. 5 depicts a graph showing control valve return times for four different currents as a function of the duration of time the control valve was actuated.

FIG. 5 depicts a graph showing measured control valve return times for four different current amplitudes as a function of the duration of time the control valve was actuated. The four currents may be of different amperages with current 150 having the lowest amperage and current 156 having the greatest. FIG. 5 may show the consistency, or lack of variability, in control valve return times at current 154 and current 156, which generally increase with increasing durations of actuation. FIG. 5 likewise represents the inconsistency, or variability, in control valve return times for current 150 and 152. For example, currents 150 and 152 are each substantially lower than the expected return times that are generally represented by currents 154 and 156. Further, current 150 includes spikes in control valve return time at time $t_7$ and time $t_8$. The variability in the control valve return time associated with current 150 demonstrates a failure of the control to fully actuate during the fuel injection event, potentially resulting in an inaccurate or even failed fuel injection. As the lowest current resulting in consistent, or non-variable, control valve return times, current 154 may be the optimal current for controlling control valve solenoid 31 in the illustrated example.

FIG. 6 depicts a flowchart of method 200 for controlling a fuel injector 12 with ECM 80. In particular, method 200 may be useful for identifying and applying the minimum current necessary to ensure a successful fuel injection event with ECM 80. Method 200 may be performed repeatedly on a fuel injector in order to determine the minimum current necessary to effect a successful fuel injection event.

As depicted in FIG. 6, method 200 may begin with step 202, in which a first current is applied to control valve solenoid 31 of fuel injector 12 to place control valve 30 in an actuated state. In step 204, a second current is applied to maintain control valve 30 in the actuated state. In some embodiments, the second current is of lower amperage than the first current.

As depicted in FIG. 6, in step 206 flow of current to control valve solenoid 31 may be stopped. After flow of second current to the control valve solenoid 31 has stopped, method 200 may continue with step 208. In step 208, the time it takes for the control valve to return to a resting state (e.g., valve return time), may be determined. This determination may be made, for example, based on the detection of a peak in current induced by motion of control valve 30 from the actuated position to the resting position.

As depicted in FIG. 6, after the valve return time is determined, step 210 may be performed. In step 210, ECM 80 may be able to determine whether variability is present. Step 210 may include calculating the deviation in measured control valve return time from a calculated mean control valve return time, or an otherwise determined expected valve return time. This deviation may be compared to a variability threshold. When the deviation exceeds the threshold, the determination may be result in a step 212 being performed, as described below. When step 210 does not result in identification of variability, step 202 may be repeated.

If the control valve return time exceeds the variability threshold at different durations of actuation for a given second current, step 212 may include increasing the current to apply a higher second current until the valve return time is roughly equivalent to the set threshold. Steps 202-212 may be repeated, if desired, until ECM 80 identifies a minimum stable current.

In particular, if ECM 80 does not provide a second current in step 212 that reduces the injector's variability, method 200 may be repeated in order to identify additional control valve return times for different durations of actuation and/or different (e.g., increasing) current amplitudes. Further, if the valve return time falls below the variability threshold over a sufficiently long period of time (e.g., a predetermined amount of engine operating hours or other threshold period of time), method 200 may be repeated at one or multiple lower second currents to confirm whether the reduced current results in injection that is substantially free of variability.

Tracking control valve return time provides a method for determining whether a current supplied to a control valve 30 is capable of causing reliable and accurate fuel injection. Specifically, by tracking the control valve return time associated with different currents, is the system and method may be able to identify the minimum current necessary for effectuating a successful fuel injection. Identifying the minimum current results in more efficient energy use and reduced thermal stress on the fuel injector 12. Further, the system and method may be configured to compensate for relatively small physical differences between individual fuel injectors 12. For example, the system and method may be configured to compensate for different rates of wear, differences in position of the armature and solenoid, differences in amount of flux generated with coils of the solenoid, etc. The system and method may apply current as a test, without injecting fuel and thereby minimizing impact on operation of the internal combustion engine. The system and method may allow a controller to monitor a plurality of injectors on an individual (e.g., injector-by-injector) basis, customizing the amplitude of current based on the operation of each injector over time.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A method for controlling a fuel injector, the method comprising: applying a first current to a control valve having an actuated state and a resting state, the first current causing the control valve to move from the resting state to the actuated state; applying a second current that causes the control valve to remain in the actuated state, the second current having an amplitude that is lower than an amplitude of the first current; maintaining the second current for a duration; stopping the second current at an end of the duration to allow the control valve to return to the resting state; measuring a control valve return time based on an induced current; comparing the measured control valve return time to an expected control valve return time and setting the amplitude of current for a fuel injection event based on the comparison; and increasing the second current when the control valve return time is shorter than the expected control valve return time.

2. The method of claim 1, further including decreasing the amplitude of the current of an additional fuel injection event.

3. The method of claim 1, wherein the method further includes determining a minimum current that reduces variability of the control valve return time and setting the amplitude of current for the fuel injection event to the minimum current.

4. The method of claim 1, wherein the first current has a first amplitude and the second current has a second amplitude, the second amplitude being lower than the first amplitude.

5. The method of claim 1, wherein the method is repeated on all fuel injectors in an internal combustion engine.

6. A method for controlling a fuel injector, the method comprising: determining an expected valve return time for a control valve of the fuel injector, the expected valve return time being associated with an amplitude of current; applying a current to the control valve, the control valve having an actuated state and a resting state, the current causing the control valve to be in the actuated state; stopping supply of the current to the control valve; measuring a valve return time, after stopping supply of the current, based on induced current; comparing the measured valve return time to the expected valve return time; setting a current amplitude for a fuel injection event based on the comparison; increasing the current amplitude when the measured valve return time is sooner than the expected valve return time; and decreasing the current amplitude when the measured valve return time exceeds the expected valve return time.

7. The method of claim 6, further including increasing the current amplitude until the measured valve return time does not deviate from the expected valve return time.

8. The method of claim 6, wherein the method further includes using the current amplitude for a fuel injection event that is controlled with the control valve.

9. The method of claim 6, wherein the method is repeated on every fuel injector in an internal combustion engine.

10. A system for controlling a fuel injector, the system comprising: a control valve having an actuated state and a resting state; a control valve solenoid capable of causing the control valve to move between the actuated state and the resting state; and a controller, the controller configured to: determine an expected control valve return time at which the control valve returns to the resting state from the actuated state, apply current to the control valve for a duration, measure the control valve return time based on induced current, compare the measured control valve return time to the expected control valve return time, determine an amplitude of current for a fuel injection event based on the comparison, increase the amplitude to cause the measured control valve return time to be approximately equal to the expected control valve return time, and decrease the current when the measured control valve return time is not sooner than the expected control valve return time for a plurality of fuel injection events.

11. The system of claim 10, wherein the controller is further configured to increase the amplitude when the measured control valve is lower than the expected control valve return time.

12. The system of claim 10, wherein the controller is further configured to increase the amplitude across a plurality of amplitude levels based on a plurality of measured control valve return times for the fuel injector.

13. The system of claim 10, wherein the system includes a plurality of fuel injectors, the controller being further configured to determine different current amplitudes for respective fuel injectors.

* * * * *